US012607451B2

(12) United States Patent
Chen et al.

(10) Patent No.: US 12,607,451 B2
(45) Date of Patent: Apr. 21, 2026

(54) LOW COHERENCE INTERFEROMETER IMAGING SYSTEM

(71) Applicant: National Taiwan University, Taipei (TW)

(72) Inventors: Ting-Hao Chen, Taipei (TW); Hsiang-Chieh Lee, Taipei (TW); Tai-Ang Wang, Taipei (TW)

(73) Assignee: National Taiwan University, Taipei (TW)

( * ) Notice: Subject to any disclaimer, the term of this patent is extended or adjusted under 35 U.S.C. 154(b) by 101 days.

(21) Appl. No.: 18/600,774

(22) Filed: Mar. 11, 2024

(65) Prior Publication Data

US 2025/0224226 A1 Jul. 10, 2025

(30) Foreign Application Priority Data

Jan. 9, 2024 (TW) ................................. 113100966

(51) Int. Cl.
*G01B 9/02091* (2022.01)
*G01B 9/02* (2022.01)
*G01B 9/02015* (2022.01)
*G06T 1/00* (2006.01)

(52) U.S. Cl.
CPC ..... *G01B 9/02091* (2013.01); *G01B 9/02028* (2013.01); *G01B 9/02034* (2013.01); *G06T 1/0007* (2013.01)

(58) Field of Classification Search
CPC .................... G01B 9/02091; G01B 9/02028
See application file for complete search history.

(56) References Cited

U.S. PATENT DOCUMENTS

| | | | |
|---|---|---|---|
| 8,120,779 B2 | 2/2012 | Buckland et al. | |
| 8,711,364 B2 | 4/2014 | Brennan et al. | |

(Continued)

FOREIGN PATENT DOCUMENTS

| | | |
|---|---|---|
| TW | M455474 | 6/2013 |
| TW | I752616 | 1/2022 |

OTHER PUBLICATIONS

Jonathan, E., "Dual reference arm low-coherence interferometer-based reflectometer for optical coherence tomography (OCT) application", Optics Communications, Aug. 1, 2005, pp. 202-211, col. 252, No. 1-3. (Year: 2005).*

(Continued)

*Primary Examiner* — Michelle M Iacoletti
*Assistant Examiner* — Alexandria Mendoza
(74) *Attorney, Agent, or Firm* — JCIPRNET

(57) ABSTRACT

A low coherence interferometer imaging system includes an imaging engine generating a reference beam and an object beam, a first beam splitting element, reference ends, a sample end, and optical imaging modules arranged at the sample end. The first beam splitting element is disposed on an optical path of the reference beam and generates sub-reference beams after the reference beam passes through the first beam splitting element. The reflected sub-reference beams and the reflected object beam form interference signals through the imaging engine. The imaging engine generates images after analyzing the interference signals. One optical imaging module is first arranged at the sample end; the remaining optical imaging modules are sequentially arranged at the sample end in an optical-path series manner so that the images exhibit distinct imaging fields of view before and after the optical imaging module is arranged and when arrangement parameters of the imaging engine remain unchanged.

15 Claims, 10 Drawing Sheets

(56)  References Cited

U.S. PATENT DOCUMENTS

| | | | |
|---|---|---|---|
| 2017/0105618 A1* | 4/2017 | Schmoll | G01B 9/02044 |
| 2018/0049642 A1 | 2/2018 | Mak | |
| 2021/0007601 A1 | 1/2021 | Schmoll et al. | |
| 2021/0025690 A1* | 1/2021 | Tearney | G01B 9/02087 |
| 2021/0199418 A1* | 7/2021 | Yan | G01B 9/02027 |
| 2022/0078341 A1* | 3/2022 | Lee | H04N 23/56 |
| 2023/0160681 A1 | 5/2023 | Hai Vidal et al. | |
| 2023/0400293 A1 | 12/2023 | Tearney et al. | |

OTHER PUBLICATIONS

Yongjoo Kim, Norman Lippok, and Benjamin J. Vakoc, "Multi-beam OCT imaging based on an integrated, free-space interferometer," Biomed. Opt. Express 12, 100-109 (2021) (Year: 2021).*

Matthew A. Goodman, R. Krishna Mohan, Zeb W. Barber, and Wm. Randall Babbitt, "Digital holographic polarimeter using dual reference beam interferometry," Appl. Opt. 60, 6526-6537 (2021) (Year: 2021).*

"Office Action of Taiwan Counterpart Application", issued on Dec. 10, 2024, p. 1-p. 4.

Enock Jonathan, "Dual reference arm low-coherence interferometer-based reflectometer for optical coherence tomography (OCT) application", Optics Communications, Aug. 1, 2005, pp. 202-211, vol. 252, No. 1-3.

Roy De Kinkelder et al., "Heartbeat-Induced Axial Motion Artifacts in Optical Coherence Tomography Measurements of the Retina", Investigative Ophthalmology & Visual Science, May 2011, pp. 3908-3912, vol. 52, No. 6.

* cited by examiner

@FOV-1

@FOV-2

@FOV-1

@FOV-2

LOW COHERENCE INTERFEROMETER IMAGING SYSTEM

CROSS-REFERENCE TO RELATED APPLICATION

This application claims the priority benefit of Taiwan application serial no. 113100966, filed on Jan. 9, 2024. The entirety of the above-mentioned patent application is hereby incorporated by reference herein and made a part of this specification.

BACKGROUND

Technical Field

The disclosure relates to an imaging system; more particularly, the disclosure relates to a low coherence interferometer imaging system.

Description of Related Art

Optical coherence tomography (OCT) based on low coherence interferometry may be classified into three categories: a time domain OCT, a spectral domain OCT, and a swept-source OCT. In all three interferometer types, a sample end is designed similarly to a conventional optical microscope, where an imaging field of view is adjusted by switching the objective lens. However, this design introduces challenges for portable sample ends, such as handheld probes, as such design increases both the weight and the volume of the sample end. Conversely, utilizing a compact sample end design poses difficulties in replacing optical elements or objective lenses within the original optical imaging module. On the other hand, configuring a single reference end with a fixed length often results in a change in imaging position with depth when replacing the optical elements or objective lenses. This change can be attributed to variations in the optical path length between the sample end and the reference end, influenced by the characteristics of a spectrometer in the spectral domain OCT or the relatively short instantaneous coherence length of a swept-source laser used in the swept-source OCT. Consequently, this change can impact image intensity. By contrast, configuring a single reference end with a variable length presents challenges when attempting to maintain the original imaging depth position during the replacement of optical elements or objective lenses in the original imaging module, and adjustment to the length of the reference end is necessary to preserve the original imaging position, thus leading to operational inconveniences.

SUMMARY

The disclosure provides a low coherence interferometer imaging system facilitating swift switching between imaging fields of view under circumstances where an overall optical system volume is small or optical elements are arranged in a complex manner and cannot be easily replaced.

An embodiment of the disclosure provides a low coherence interferometer imaging system that includes an imaging engine, a first beam splitting element, a plurality of reference ends, a sample end, and a plurality of optical imaging modules. The imaging engine is configured to generate a reference beam and an object beam. The first beam splitting element is disposed on an optical path of the reference beam and configured to generate a plurality of sub-reference beams after the reference beam passes through the first beam splitting element. The reference ends are respectively disposed optical paths of the sub-reference beams and configured to receive and reflect the sub-reference beams back to the first beam splitting element. The reflected sub-reference beams are transmitted to the imaging engine through the first beam splitting element. The sample end is disposed on an optical path of the object beam. After the sample end receives the object beam, the object beam is transmitted to a to-be-tested sample, the to-be-tested sample reflects the object beam, and the reflected object beam is transmitted to the imaging engine through the sample end. The optical imaging modules are configured to be arranged at the sample end. The reflected sub-reference beams and the reflected object beam form a plurality of interference signals through the imaging engine, and the imaging engine analyzes the interference signals and generates a plurality of images. The number of the optical imaging modules equals the number of the reference ends. One of the optical imaging modules is first arranged at the sample end, and the remaining optical imaging modules are sequentially arranged at the sample end in an optical-path series manner so that the images may exhibit distinct imaging fields of view before and after the optical imaging modules are arranged and when arrangement parameters of the imaging engine remain unchanged.

In view of the above, according to one or more embodiments of the disclosure, the low coherence interferometer imaging system includes the imaging engine, the first beam splitting element, the reference ends, the sample end, and the optical imaging modules. The optical imaging modules are designed to be sequentially positioned at the sample end, the interference signals are generated by synthesizing the sub-reference beams coming from different reference ends and the object beam coming from the sample end, the images are generated by analyzing the interference signals, and the interference signals or the images may exhibit distinct imaging fields of view before and after the optical imaging modules are arranged and when the arrangement parameters of the imaging engine remain unchanged. That is, the low coherence interferometer imaging system is able to generate different imaging fields of view by, for instance, serially connecting/linking the optical imaging modules. Therefore, when the overall optical system volume is relatively small, or the optical elements are arranged in a complex manner and not easy to be replaced, designing the optical imaging modules in a serially connected/linked manner helps achieve the functions of swift switching between the imaging fields of view and further reducing the system volume.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1A:
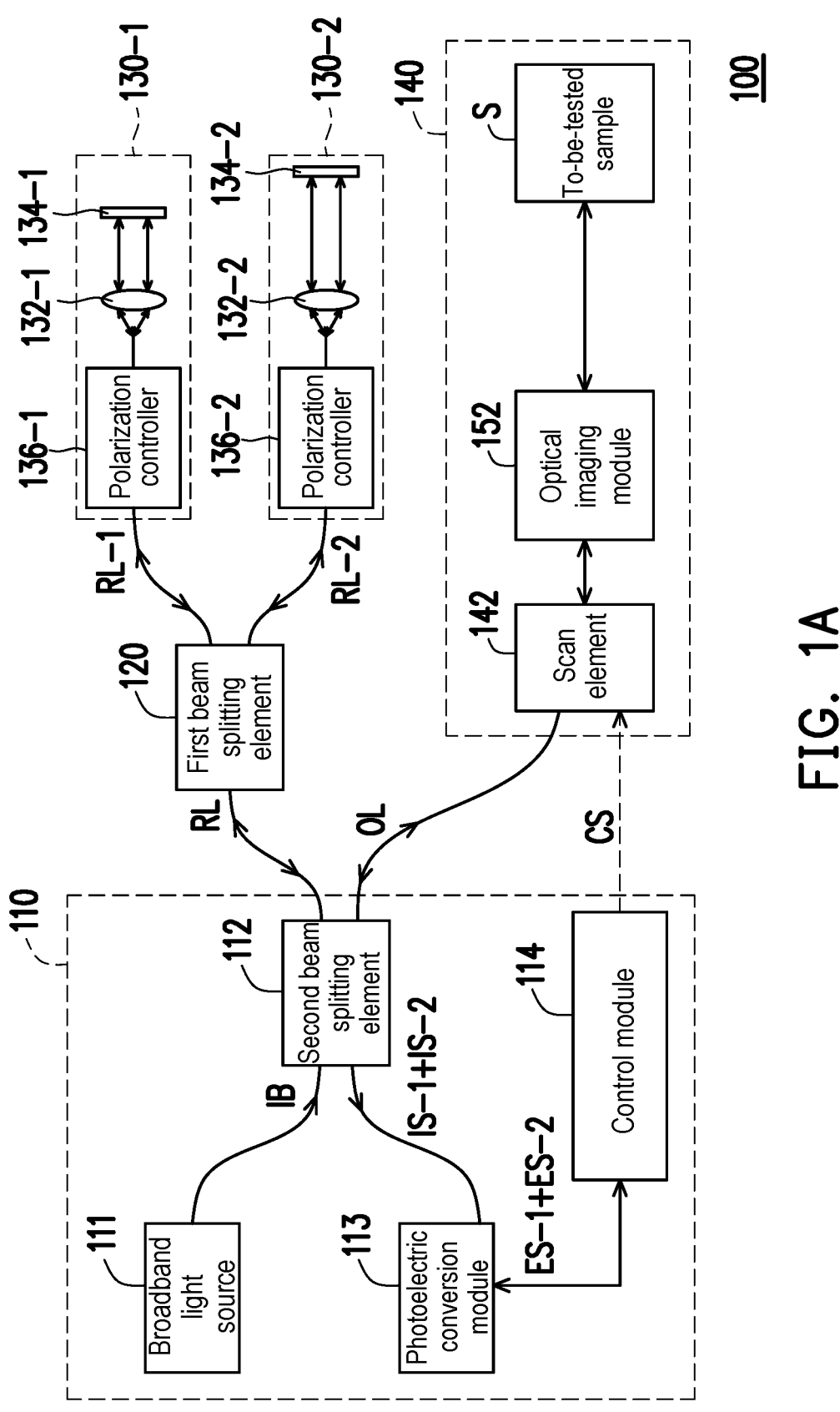
FIG. 1A is a schematic diagram of a low coherence interferometer imaging system where an optical imaging module 152 is arranged in a sample end 140 according to a first embodiment of the disclosure.
Figure 1B:
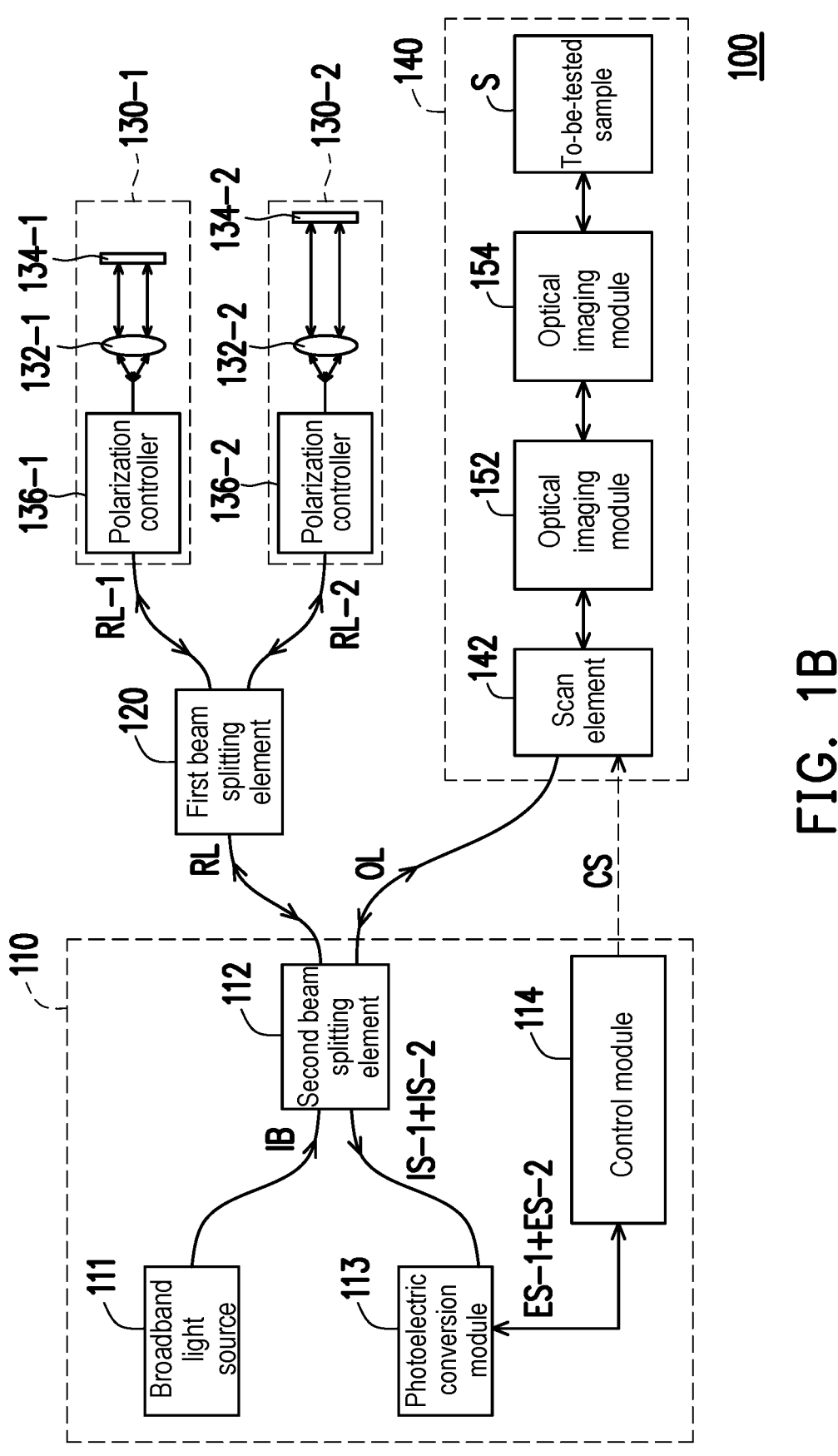
FIG. 1B is a schematic diagram of the low coherence interferometer imaging system where optical imaging modules 152 and 154 are arranged at the sample end 140 according to the first embodiment of the disclosure.

FIG. 1A is a schematic diagram of a low coherence interferometer imaging system where an optical imaging module 152 is arranged in a sample end 140 according to a first embodiment of the disclosure. FIG. 1B is a schematic diagram of the low coherence interferometer imaging system where optical imaging modules 152 and 154 are arranged at the sample end 140 according to the first embodiment of the disclosure. With reference to FIG. 1A and FIG. 1B, an embodiment of disclosure provides a low coherence interferometer imaging system 100, which includes an imaging engine 110, a first beam splitting element 120, a plurality of reference ends 130-1, 130-2, a sample end 140, and a plurality of optical imaging modules 152, 154.

In this embodiment, the imaging engine 110 is configured to generate a reference beam RL and an object beam OL.

The first beam splitting element 120 is disposed on an optical path of the reference beam RL and is configured to generate a plurality of sub-reference beams RL-1, RL-2 after the reference beam RL passes through the first beam splitting element 120. The reference ends 130-1, 130-2 are respectively disposed on optical paths of the sub-reference beams RL-1, RL-2 and are configured to receive the sub-reference beams RL-1, RL-2 and reflect the sub-reference beams RL-1, RL-2 back to the first beam splitting element 120. The reflected sub-reference beams RL-1, RL-2 are then transmitted to the imaging engine 110 through the first beam splitting element 120. The sample end 140 is disposed on an optical path of the object beam OL. After the sample end 140 receives the object beam OL, the object beam OL is transmitted to a to-be-tested sample S. The to-be-tested sample S reflects the object beam OL, and the reflected object beam OL is then transmitted to the imaging engine 110 through the sample end 140.

In this embodiment, the optical imaging modules 152, 154 are configured to be positioned at the sample end 140. Each of the optical imaging modules 152, 154, for instance, includes a combination of one or more optical lenses having refractive power. The optical lens may include various combinations of non-planar lenses, such as biconcave lenses, biconvex lenses, concave-convex lenses, convex-concave lenses, plano-convex lenses, plano-concave lenses, and the like. The form and the type of the optical imaging modules 152, 154 should however not be construed as a limitation in the disclosure. In other embodiments, the optical imaging modules 152, 154 may further include elements for special applications, such as functional OCT or other elements which can assist in imaging, e.g., wave plates, polarization elements, fastening mechanisms between elements or modules, and so on.

In this embodiment, the reflected sub-reference beams RL-1, RL-2 and the reflected object beam OL form a plurality of interference signals IS-1, IS-2 through the imaging engine 110. The imaging engine 110 analyzes the interference signals IS-1, IS-2 to generate a plurality of images.

In this embodiment, the number of the optical imaging modules 152, 154 equals the number of the reference ends 130-1, 130-2. The optical imaging modules 152, 154 are sequentially disposed at the sample end 140 so that the images may exhibit distinct imaging fields of view before and after the optical imaging modules 152, 154 are arranged and arrangement parameters of the imaging engine 110 remain unchanged. That is, one of the optical imaging modules 152, 154 is first arranged at the sample end 140, and the remaining optical imaging modules 152, 154 are then sequentially arranged at the sample end 140 in an optical-path series manner. For instance, as shown in FIG. 1A, the optical imaging module 152 is first positioned at the sample end 140. Then, as shown in FIG. 1B, the optical imaging module 154 is serially connected/linked to the optical imaging module 152.

Specifically, in this embodiment, the reference ends 130-1 and 130-2, respectively, includes collimating lenses 132-1, 132-2 and reflective elements 134-1, 134-2. The collimating lenses 132-1, 132-2 are respectively disposed on the optical path of one of the sub-reference beams RL-1, RL-2. The collimating lenses 132-1, 132-2 are, for instance, lenses that may collimate beams. On the optical path of one of the sub-reference beams RL-1, RL-2, the collimating lenses 132-1, 132-2 are respectively disposed between the first beam splitting element 120 and the reflective elements 134-1, 134-2. The reflective elements 134-1, 134-2 are respectively configured to receive and reflect one of the sub-reference beams RL-1, RL-2. Here, the reflective elements 134-1, 134-2 are optical elements with reflective functions. In this embodiment, the reflective elements 134-1, 134-2 are, for instance, metal blocks, and a material of such metal may include gold (i.e., a gold mirror) or silver (i.e., a silver mirror). In other embodiments, the reflective elements 134-1, 134-2 may also be reflectors, a surface of which is coated with a material with high reflectivity, or the reflective elements 134-1, 134-2 may be composed of multi-layered dielectric film, which should however not be construed as a limitation in the disclosure.

In another embodiment, the reference ends 130-1, 130-2 further include polarization controllers 136-1, 136-2, respectively, and the polarization controllers 136-1, 136-2 are disposed between the first beam splitting element 120 and the collimating lenses 132-1, 132-2 on the optical path of one of the sub-reference beams RL-1, RL-2.

In this embodiment, the sample end 140 includes a scan element 142. On the optical path of the object beam OL, the scan element 142 is disposed between the imaging engine 110 and the optical imaging modules 152, 154 and is electrically connected to the imaging engine 110. The scan element 142 is a mechanical element that may change an irradiation position of a beam on the to-be-tested sample S. In an embodiment, the scan element 142 may include two high-reflective mirrors (also known as galvanometer mirrors) arranged perpendicularly to each other, and the two high-reflective mirrors are referred to as first and second high-reflective mirrors. Each high-reflective mirror has a rotation axis and may vibrate back and forth according to the rotation axis. In another embodiment, the scan element 142 may further include a high-reflective mirror and a displacement module for displacing this high-reflective mirror in a two-dimensional plane. In yet another embodiment, the scan element is, for instance, a micro-electro-mechanical system (MEMS) mirror that may rotate in two different directions, which should however not be construed as a limitation in the disclosure.

In this embodiment, the imaging engine 110 includes a broadband light source 111, a second beam splitting element 112, a photoelectric conversion module 113, and a control module 114. The broadband light source 111 is configured to generate an illumination beam IB. The types of the broadband light source 111 may include a light emitting diode (LED), a superluminescent LED, a short pulse laser light source, or other suitable light emitting elements having characteristics of wide bandwidths. In this embodiment, when the low coherence interferometer imaging system 100 is configured to measure human tissue, it is preferable to select a visible light band (390 nanometers to 700 nanometers) or a near-infrared light band (700 nanometers to 1700 nanometers) as a primary emission wavelength band of the broadband light source 111, where the central wavelength is the wavelength corresponding to the maximum light intensity in a light intensity spectrum of the broadband light source 111. In other embodiments, the selection of the central wavelength of the broadband light source 111 may be determined based on different to-be-tested samples S, which should however not be construed as a limitation in the disclosure.

In this embodiment, the second beam splitting element 112 is disposed on an optical path of the illumination beam IB and is configured to generate the reference beam RL and the object beam OL after the illumination beam IB passes through the second beam splitting element 112. The second beam splitting element 112 receives the reflected sub-reference beams RL-1, RL-2 (from the first beam splitting element 120) and the reflected object beam OL (from the scan element 142) to form the interference signals IS-1, IS-2.

In this embodiment, the photoelectric conversion module 113 is disposed on an optical path of the interference signals IS-1, IS-2 and configured to convert synthetic signals of the interference signals IS-1, IS-2 into a plurality of electrical signals ES-1, ES-2. The photoelectric conversion module 113 may be composed of one or more image sensors, such as a line scan camera composed of a plurality of image sensors arranged in a single direction. The types of the image sensors may include complementary metal-oxide-semiconductor (CMOS) image sensing elements or charge-coupled device (CCD) image sensing elements, which should however not be construed as a limitation in the disclosure.

In this embodiment, the control module 114, for instance, includes a microcontroller unit (MCU), a central processing unit (CPU), a microprocessor, a digital signal processor (DSP), a programmable controller, a programmable logic device (PLD), a field programmable gate array (FPGA), other similar devices, or a combination of these devices, which should however not be construed as a limitation in the disclosure. Moreover, in an embodiment, various functions of the control module 114 may be implemented as a plurality of programming codes. The programming codes are stored in a memory/storage unit, and the control module 114 executes the programming codes. Alternatively, in an embodiment, the various functions of the control module 114 may be implemented as one or more circuits, and whether the various functions of the control module 114 are performed by applying software or hardware should not be construed as a limitation in the disclosure. In an embodiment, the control module 114 may further include a data acquisition card, a computer, a tablet computer, a smartphone, other electronic devices, and so forth.

In this embodiment, the control module 114 is electrically connected to the photoelectric conversion module 113 and the scan element 142, configured to convert the electrical signals ES-1, ES-2 into images, and controls the scan element 142 by outputting a control signal CS to control a position where the object beam OL is incident to the to-be-tested sample S.

In addition, according to this embodiment, optical elements in the low coherence interferometer imaging system 100 may be connected by optical transmission elements, such as optical fibers. Therefore, the first beam splitting element 120 or the second beam splitting element 112 is, for instance, a 50/50 optical fiber coupler; that is, the light beam incident to the 50/50 optical fiber coupler may be evenly distributed to two output ends at a 50:50 beam splitting ratio, thereby achieving beam splitting. Alternatively, when the reflectivity of the to-be-tested sample S is relatively low, the first beam splitting element 120 may be an optical fiber coupler splitting the beam at another ratio. For instance, the first beam splitting element 120 may be a 30/70 optical fiber coupler or any other optical fiber coupler which can split the beam at an appropriate ratio, so as to increase the irradiation power corresponding to the sample end 140. By contrast, if light beams are incident to the first beam splitting element 120 or the second beam splitting element 112 from different incident directions, the light beams may be combined by the beam splitting element to generate a synthetic beam. FIG. 1A and FIG. 1B schematically illustrate the two reference ends 130-1, 130-2. When the low coherence interferometer imaging system 100 has more reference ends, the first beam splitting element 120 may be composed of a plurality of beam splitting elements or may be a one-to-many output beam splitting element formed by combining a plurality of dual-output beam splitting elements, so as to split the reference beam RL into the sub-reference beams, the number of which is equal to the number of the reference ends.

In another embodiment, free space may exist among the optical elements in the low coherence interferometer imaging system 100. Alternatively, free space may exist among the optical elements in the low coherence interferometer imaging system 100, and reflective elements or other elements configured to change the moving direction of a beam may be disposed in the free space to adjust the arrangement position of the optical elements in the low coherence interferometer imaging system 100.

Figure 2A:
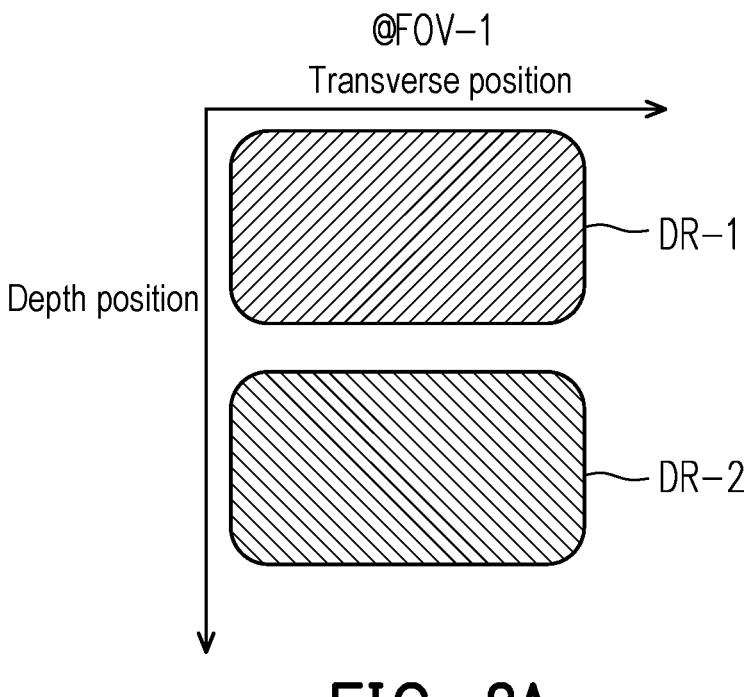
FIG. 2A is a schematic diagram exemplarily illustrating an imaging depth position between images generated by a low coherence interferometer imaging system in an embodiment of the disclosure, given an imaging field of view FOV-1.
Figure 2B:
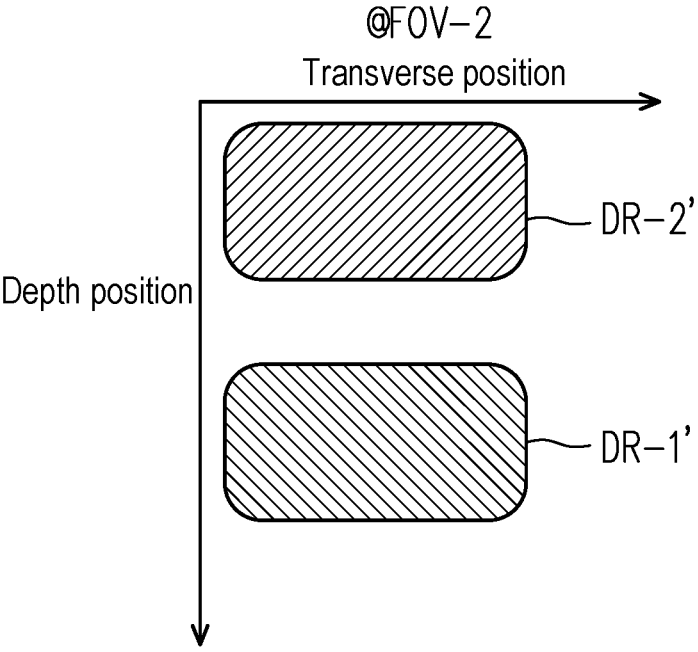
FIG. 2B is a schematic diagram exemplarily illustrating an imaging depth position between images generated by a low coherence interferometer imaging system in an embodiment of the disclosure, given an imaging field of view FOV-2.

FIG. 2A is a schematic diagram exemplarily illustrating an imaging depth position between images generated by a low coherence interferometer imaging system in an embodiment of the disclosure, given an imaging field of view FOV-1. FIG. 2B is a schematic diagram exemplarily illustrating an imaging depth position between images generated by a low coherence interferometer imaging system in an embodiment of the disclosure, given an imaging field of view FOV-2. For the sake of convenience in illustrating that there are different optical path lengths between the reference ends 130-1,130-2, the reference ends 130-1, 130-2 in FIG. 1A and FIG. 1B are depicted as having different lengths so that an optical path difference between the reflected sub-reference beam RL-1 and the reflected object beam OL is different from an optical path difference between the reflected sub-reference beam RL-2 and the reflected object beam OL. However, in other embodiments, the reference ends 130-1, 130-2 may be designed to have the same length but different refractive indices so that there are different optical path lengths between the reference ends 130-1, 130-2. Moreover, the image corresponding to the reference end 130-1/the interference signal IS-1 has imaging depth positions DR-1, DR-1', and the image corresponding to the reference end 130-2/the interference signal IS-2 has imaging depth positions DR-2, DR-2'. Here, the imaging depth positions DR-1, DR-2, DR-1', and DR-2' may be defined as a range from the minimum imaging depth to the maximum imaging depth of the images. In addition, when the optical imaging module 152 is positioned at the sample end 140, the images corresponding to the interference signals IS-1 and IS-2 have an imaging field of view FOV-1, as shown in FIG. 1A. When the optical imaging modules 152 and 154 are positioned at the sample end 140, the images corresponding to the interference signals IS-1 and IS-2 have an imaging field of view FOV-2, as shown in FIG. 1B.

With reference to FIG. 1A to FIG. 2B, in this embodiment, the reference ends 130-1, 130-2, respectively, have different optical path lengths, and the imaging depth positions DR-1, DR-2, DR-1', DR-2' of the images are changed as the optical imaging modules 152, 154 are sequentially disposed at the sample end 140. Moreover, as the optical imaging modules 152, 154 are sequentially disposed at the sample end 140, the imaging depth range of the images (which may be defined as the difference between the maximum imaging depth and the minimum imaging depth) may be changed accordingly. For instance, FIG. 2B not only schematically illustrates that the imaging field of view FOV-2 is reduced (smaller than the imaging field of view FOV-1 in FIG. 2A) but also depicts that the imaging depth range of the images is reduced. In addition, the images exhibit distinct imaging depth positions DR-1, DR-2, DR-1', DR-2', and the imaging depth positions DR-1, DR-2, DR-1', DR-2' of one of the images and the imaging depth positions DR-1, DR-2, DR-1', DR-2' of another one of the images are not overlapped.

In an embodiment, the images have different imaging depth positions DR-1, DR-2, DR-1', DR-2', and the image intensity of one of the images is lower than or equal to an image background noise intensity. For instance, in FIG. 1A and FIG. 2A, the intensity of the interference signal IS-2 is close to the image background noise intensity due to a roll-off effect, thus rendering an unclear image. Similarly, in FIG. 1B and FIG. 2B, the intensity of the interference signal IS-1 is close to the image background noise intensity due to the roll-off effect, thus rendering an unclear image. However, in another embodiment, the low coherence interferometer imaging system 100 may be designed to render clear images, even though the interference signal IS-2 in FIG. 1A and FIG. 2A or the interference signal IS-1 in FIG. 1B and FIG. 2B has a relatively low intensity due to the roll-off effect. Accordingly, both interference signals IS-1 and IS-2 may be clearly imaged.

Figure 3A:
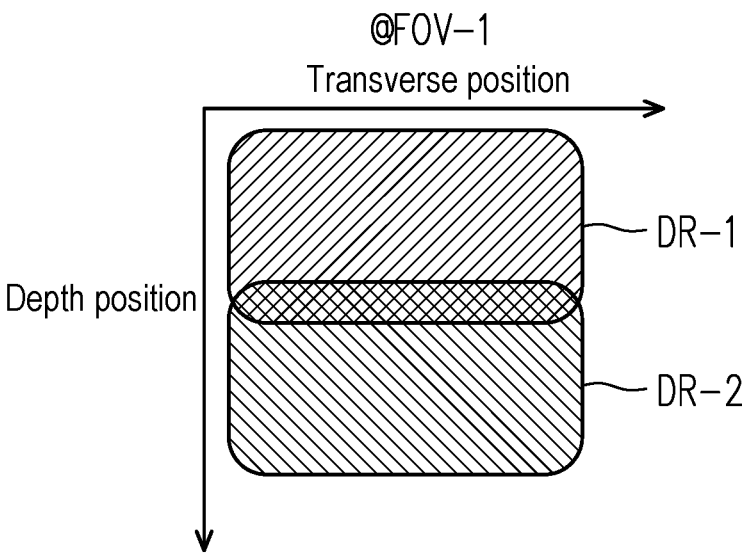
FIG. 3A is a schematic diagram exemplarily illustrating an imaging depth position between images generated by a low coherence interferometer imaging system in another embodiment of the disclosure, given the imaging field of view FOV-1.
Figure 3B:
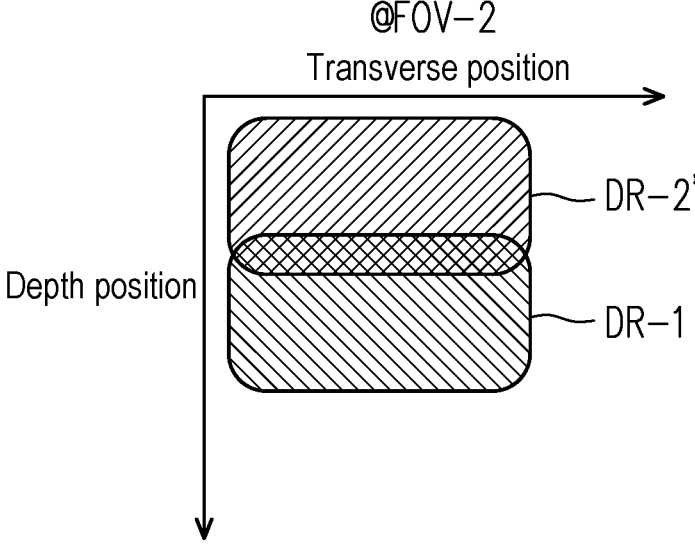
FIG. 3B is a schematic diagram exemplarily illustrating an imaging depth position between images generated by a low coherence interferometer imaging system in another embodiment of the disclosure, given the imaging field of view FOV-2.

FIG. 3A is a schematic diagram exemplarily illustrating an imaging depth position between images generated by a low coherence interferometer imaging system in another embodiment of the disclosure, given the imaging field of view FOV-1. FIG. 3B is a schematic diagram exemplarily illustrating an imaging depth position between images generated by a low coherence interferometer imaging system in another embodiment of the disclosure, given the imaging field of view FOV-2. The embodiment depicted in FIG. 3A and FIG. 3B is similar to the embodiment illustrated in FIG. 2A and FIG. 2B, while the main difference therebetween lies in that the images in this embodiment have different imaging depth positions DR-1, DR-2, DR-1', DR-2', and the imaging depth positions DR-1, DR-2, DR-1', DR-2' of one of the images and the imaging depth positions DR-1, DR-2, DR-1', DR-2' of another one of the images are partially overlapped.

That is, owing to the sensitivity roll-off characteristics of a spectral domain OCT or a swept-source OCT, a signal-to-noise ratio (SNR) decreases together with the depth. Then, according to the characteristics of a spectrometer in the spectral domain OCT or the characteristics of a swept-source light source in the swept-source OCT, the SNR ratio may drop sharply or slowly. Therefore, according to the sensitivity roll-off characteristics of the system, by adjusting the length difference between the two reference ends, the low coherence interferometer imaging system 100 provided in an embodiment of the disclosure may produce the effects provided in the embodiments depicted in FIG. 2A to FIG. 3B.

Based on the above, in an embodiment of the disclosure, the low coherence interferometer imaging system 100 includes the imaging engine 110, the first beam splitting element 120, the reference ends 130-1, 130-2, the sample end 140, and the optical imaging modules 152, 154. The imaging engine 110 is configured to generate the reference beam RL and the object beam OL. The first beam splitting element 120 is configured to generate the sub-reference beams RL-1, RL-2 after the reference beam RL passes through the first beam splitting element 120. The reference ends 130-1, 130-2 are configured to receive the sub-reference beams RL-1, RL-2 and reflect the sub-reference beams RL-1, RL-2 back to the first beam splitting element 120 and the imaging engine 110. After the sample end 140 receives the object beam OL, the to-be-tested sample S reflects the object beam OL, and the reflected object beam OL is transmitted to the imaging engine 110. The reflected sub-reference beams RL-1, RL-2 and the reflected object beam OL form the interference signals IS-1, IS-2 through the imaging engine 110, and the imaging engine 110 generates the images after analyzing the interference signals IS-1, IS-2. The optical imaging modules 152, 154 are sequentially disposed at the sample end 140 so that the images exhibit distinct different imaging fields of view FOV-1, FOV-2 before and after the optical imaging modules 152, 154 are arranged and the arrangement parameters of the imaging engine 110 remain unchanged. That is, the low coherence interferometer imaging system 100 may generate different imaging fields of view FOV-1, FOV-2 by serially connecting/linking the optical imaging modules 152, 154, for instance. Therefore, when the overall optical system volume is relatively small, or the optical elements are arranged in a complex manner and are not easy to be replaced, designing the optical imaging modules 152, 154 in a serially connected/linked manner may achieve the function of swift switching between the imaging fields of view FOV-1, FOV-2 and further reducing the system volume.

Figure 4:
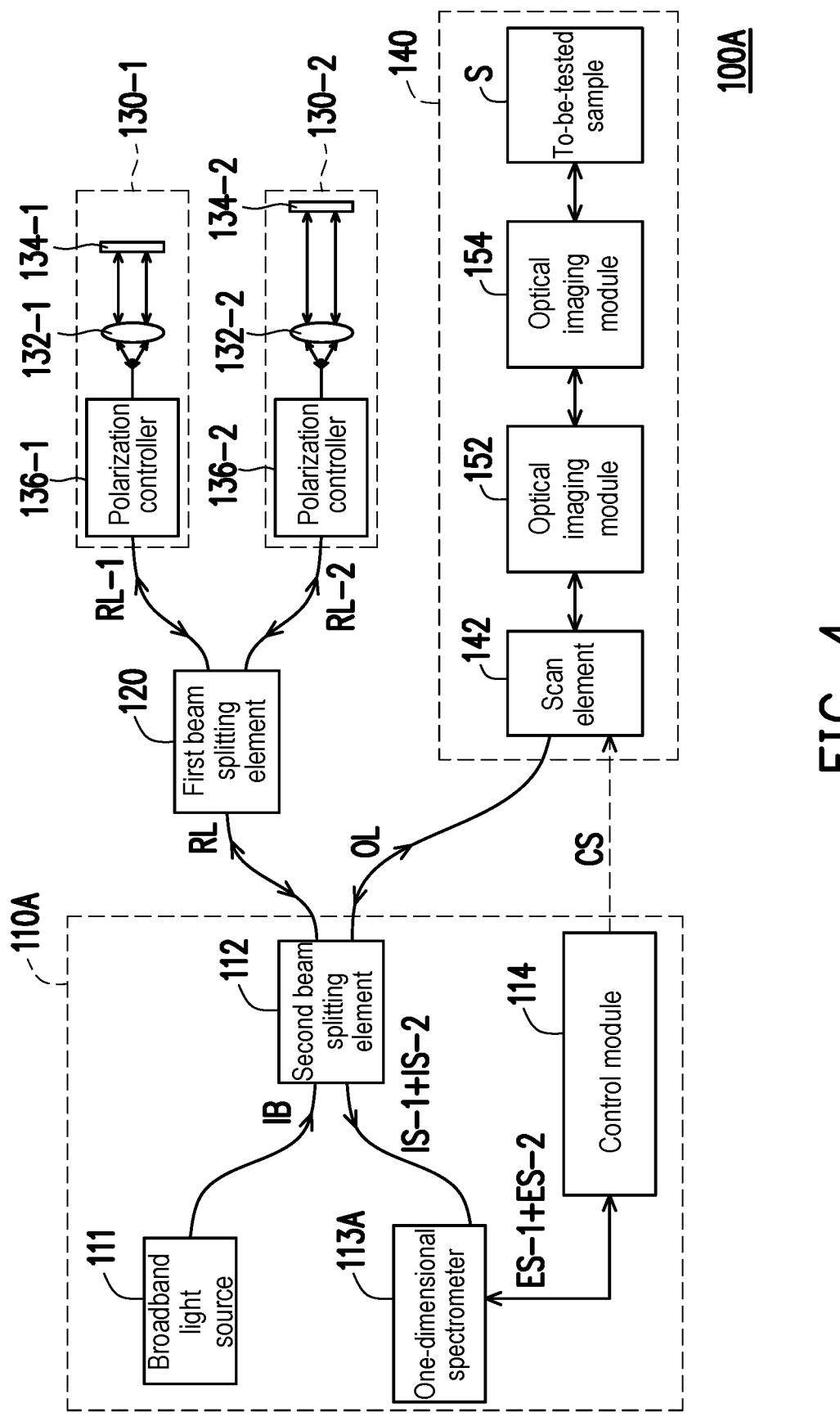
FIG. 4 is a schematic diagram of a low coherence interferometer imaging system according to a second embodiment of the disclosure.

FIG. 4 is a schematic diagram of a low coherence interferometer imaging system according to a second embodiment of the disclosure. With reference to FIG. 4, a low coherence interferometer imaging system 100A is substantially similar to the low coherence interferometer imaging system 100 in FIG. 1B, while the main difference therebetween lies in that a photoelectric conversion module 113A in an imaging engine 110A of the low coherence interferometer imaging system 100A is a one-dimensional spectrometer in the present embodiment. The one-dimensional spectrometer 113A may, for instance, include a diffraction grating and a one-dimensional array image sensor. The one-dimensional array image sensor detects an optical signal from the broadband light source. The sensor has a finite number of pixels, and each pixel does not convert an optical signal having one single frequency but converts the optical signal having a certain bandwidth. Owing to this optical signal with a certain bandwidth, the subsequently recovered image of the to-be-tested sample is characterized by the sensitivity roll-off effect. The diffraction grating performs a beam splitting operation on the interference signals IS-1, IS-2. The split optical signals may be transmitted to the one-dimensional array image sensor in different directions, and the one-dimensional array image sensor then converts the optical signals into electrical signals ES-1+ES-2. In other words, the low coherence interferometer imaging system 100A is a spectral domain optical coherence tomography (SD-OCT) imaging system.

Figure 5:
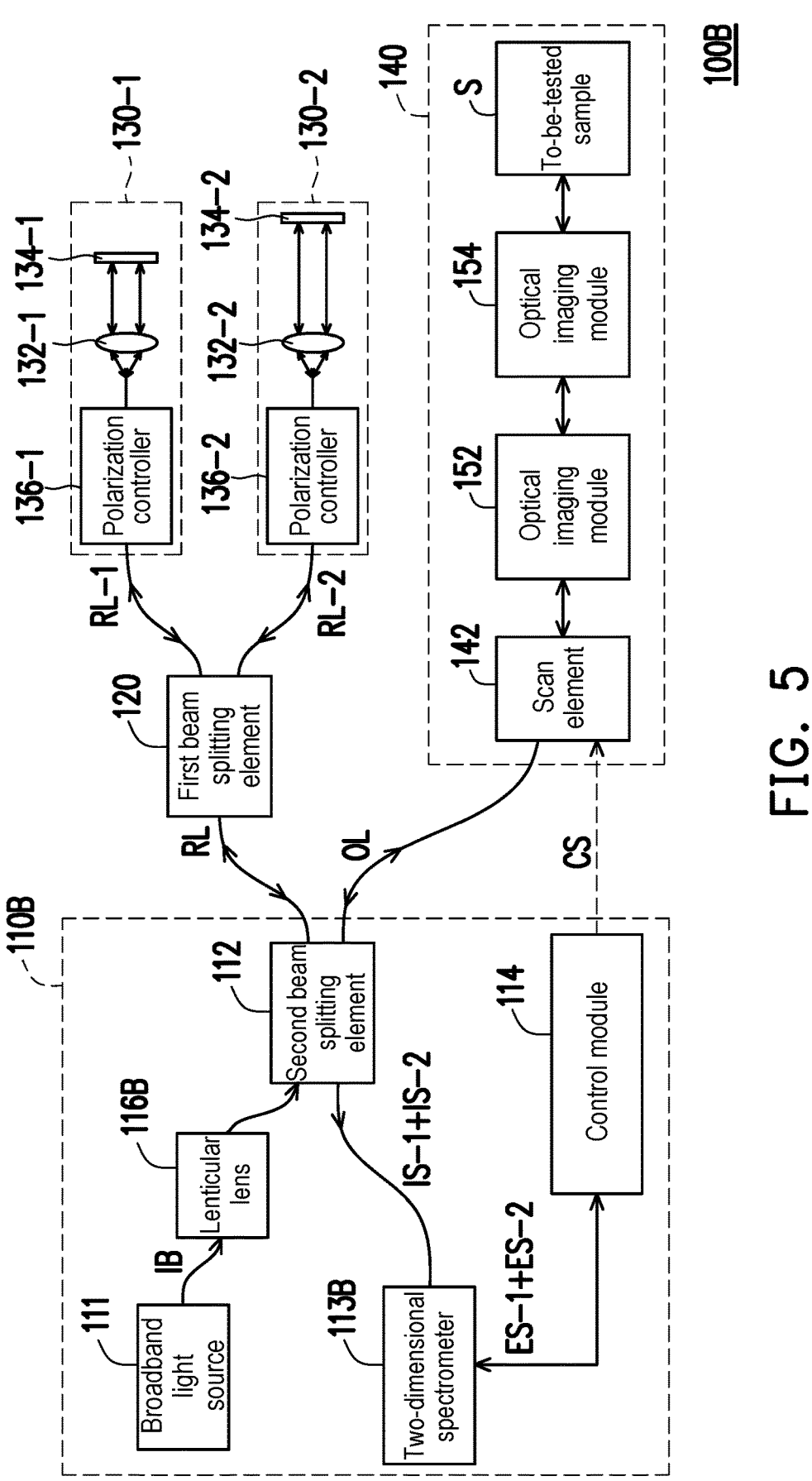
FIG. 5 is a schematic diagram of a low coherence interferometer imaging system according to a third embodiment of the disclosure.

FIG. 5 is a schematic diagram of a low coherence interferometer imaging system according to a third embodiment of the disclosure. With reference to FIG. 5, a low coherence interferometer imaging system 100B is substantially similar to the low coherence interferometer imaging system 100 in FIG. 1B, while the main difference therebetween lies in that a photoelectric conversion module 113B in an imaging engine 110B of the low coherence interferometer imaging system 100B is a two-dimensional spectrometer, and the imaging engine 110B further includes a lenticular lens 116B. On the optical path of the illumination beam IB, the lenticular lens 116B is disposed between the broadband light source 111 and the second beam splitting element 112, and the interference signals IS-1, IS-2 simultaneously come from different transverse positions of the to-be-tested sample S. In other words, the low coherence interferometer imaging system 100B is a line-field spectral domain optical coherence tomography (LF-SD-OCT) imaging system.

Figure 6:
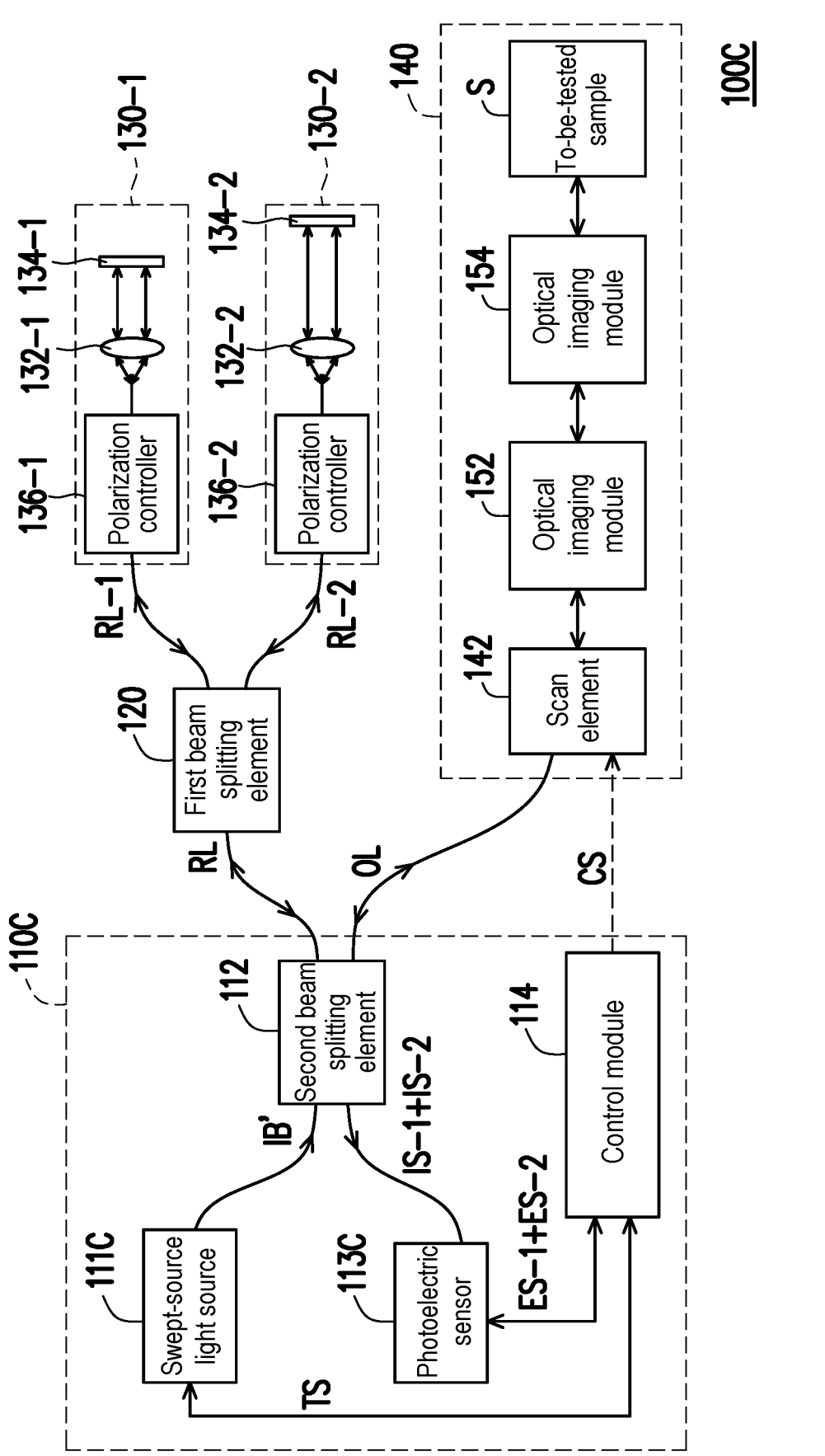
FIG. 6 is a schematic diagram of a low coherence interferometer imaging system according to a fourth embodiment of the disclosure.

FIG. 6 is a schematic diagram of a low coherence interferometer imaging system according to a fourth embodiment of the disclosure. With reference to FIG. 6, a low coherence interferometer imaging system 100C is substantially similar to the low coherence interferometer imaging system 100 in FIG. 1B, while the main difference therebetween lies in that a broadband light source 111C in an imaging engine 110C of the low coherence interferometer imaging system 100C is a swept-source light source in the present embodiment. The swept-source light source 111C is configured to transmit one or more trigger signals TS to the control module 114, where the photoelectric conversion module 113C is a photoelectric sensor. The swept-source light source 111C is configured to generate a swept illumination beam IB'. For instance, the swept-source light source 111C may emit light beams of different wavelengths from a wavelength A to a wavelength B in a chronological order, and each emitted beam approximately has one single wavelength and has a bandwidth. Due to the bandwidth, the subsequently recovered image of the to-be-tested sample is characterized by the sensitivity roll-off effect. The reflected sub-reference beams RL-1, RL-2 received by the second beam splitting element 112, the reflected object beam OL, and the interference signals IS-1, IS-2 all come from optical signals of different wavelengths. Moreover, the photoelectric sensor 113C is disposed on the optical path of the interference signals IS-1, IS-2 and configured to convert the interference signals IS-1, IS-2 into the electrical signals ES-1+ES-2. That is, the low coherence interferometer imaging system 100C is a swept-source optical coherence tomography (SS-OCT) imaging system.

Figure 7:
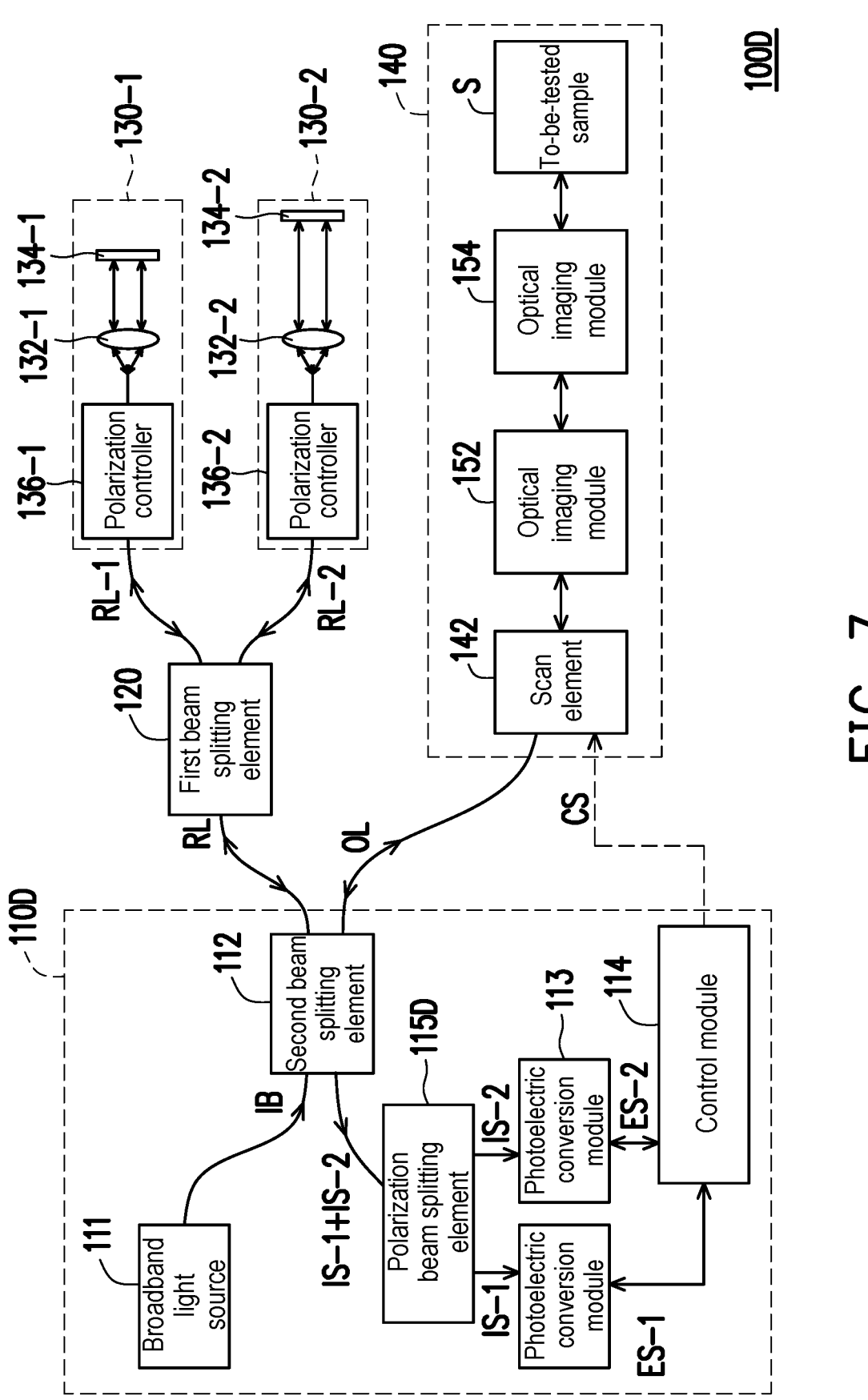
FIG. 7 is a schematic diagram of a low coherence interferometer imaging system according to a fifth embodiment of the disclosure.

FIG. 7 is a schematic diagram of a low coherence interferometer imaging system according to a fifth embodiment of the disclosure. With reference to FIG. 7, a low coherence interferometer imaging system 100D is substantially similar to the low coherence interferometer imaging system 100 in FIG. 1B, while the main difference therebetween lies in that an imaging engine 110D of the low coherence interferometer imaging system 100D includes the broadband light source 111, the second beam splitting element 112, a polarization beam splitting element 115D, a plurality of photoelectric conversion modules 113, and the control module 114. Here, the functions of the broadband light source 111, the second beam splitting element 112, and the control module 114 in the low coherence interferometer imaging system 100D are the same as those in the low coherence interferometer imaging system 100 and are not further elaborated hereinafter.

Besides, the polarization beam splitting element 115D is disposed on the optical path of the interference signals IS-1, IS-2. The polarization beam splitting element 115D receives (from the second beam splitting element 112) the interference signals IS-1, IS-2 and outputs a plurality of differently polarized interference signals IS-1, IS-2. The photoelectric conversion modules 113 are disposed on optical paths of the differently polarized interference signals IS-1, IS-2 and configured to convert the differently polarized interference signals IS-1, IS-2 into a plurality of electrical signals ES-1, ES-2. That is, the low coherence interferometer imaging system 100D is a polarization-sensitive optical coherence tomography (PS-OCT) imaging system.

Figure 8:
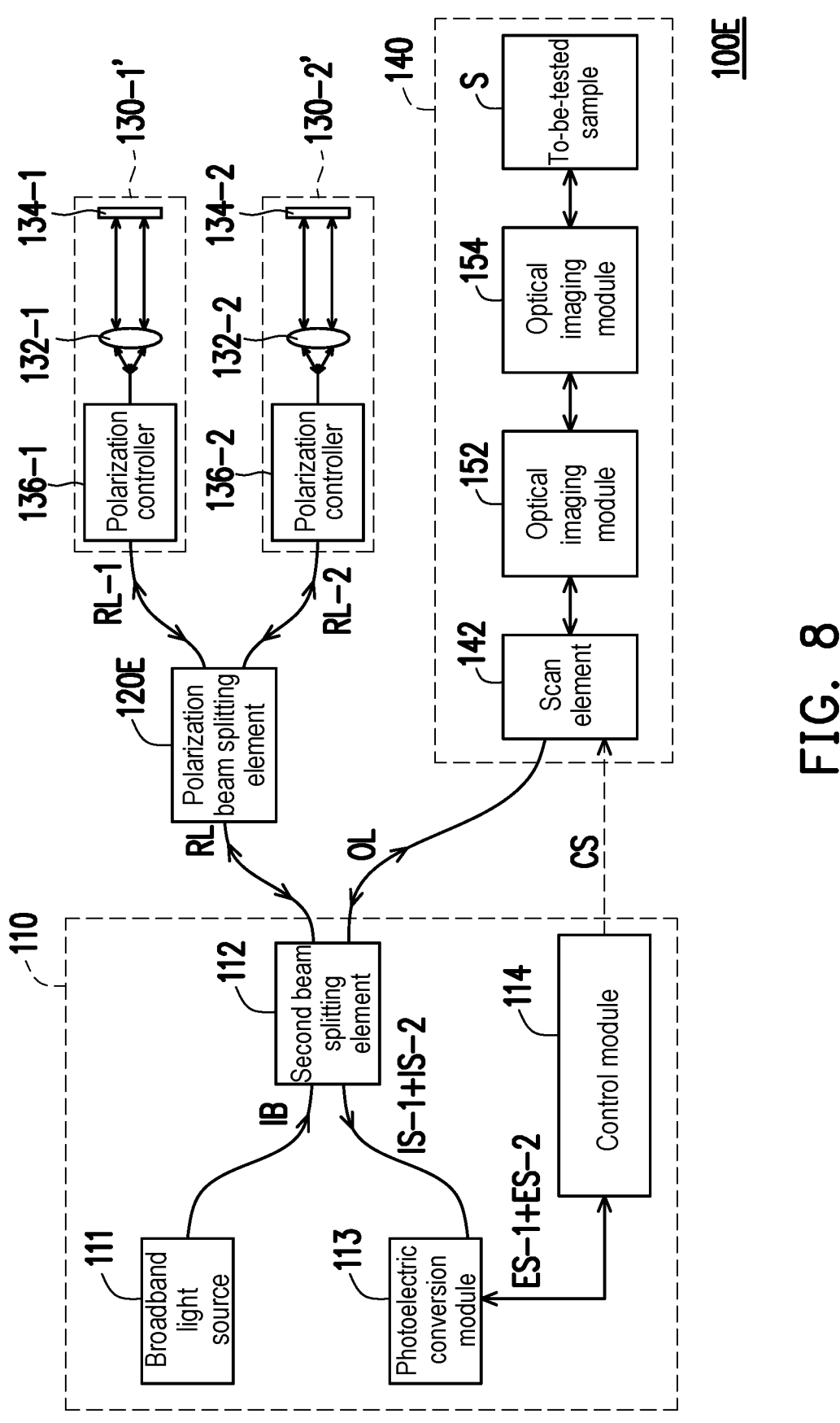
FIG. 8 is a schematic diagram of a low coherence interferometer imaging system according to a sixth embodiment of the disclosure.
Figure 9A:
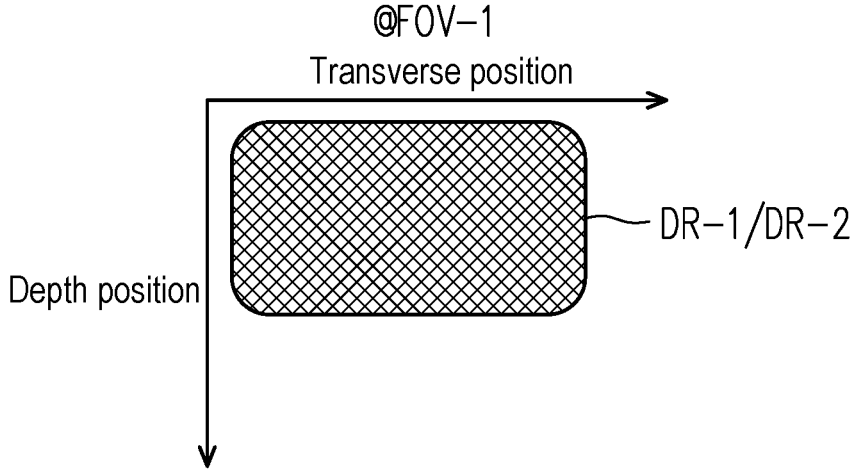
FIG. 9A is a schematic diagram exemplarily illustrating an imaging depth position between images generated by a low coherence interferometer imaging system in still another embodiment of the disclosure, given the imaging field of view FOV-1.
Figure 9B:
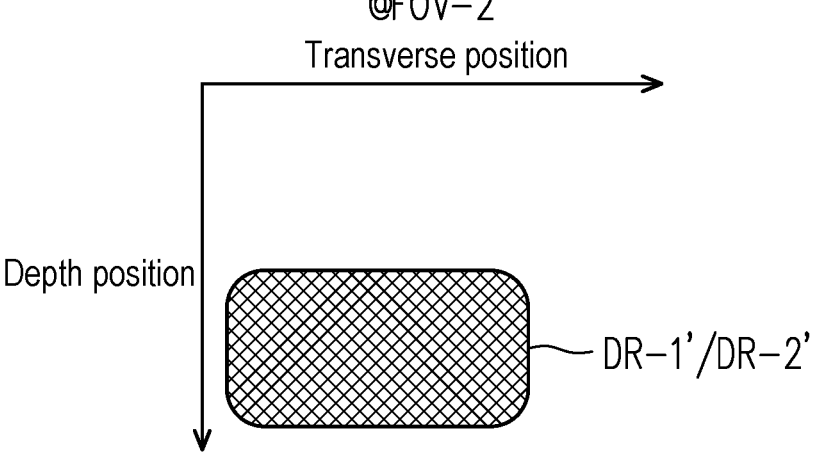
FIG. 9B is a schematic diagram exemplarily illustrating an imaging depth position between images generated by a low coherence interferometer imaging system in still another embodiment of the disclosure, given the imaging field of view FOV-2.

FIG. 8 is a schematic diagram of a low coherence interferometer imaging system according to a sixth embodiment of the disclosure. FIG. 9A is a schematic diagram exemplarily illustrating an imaging depth position between images generated by a low coherence interferometer imaging system in still another embodiment of the disclosure, given the imaging field of view FOV-1. FIG. 9B is a schematic diagram exemplarily illustrating an imaging depth position between images generated by a low coherence interferometer imaging system in still another embodiment of the disclosure, given the imaging field of view FOV-2. With reference to FIG. 8 to FIG. 9B, a low coherence interferometer imaging system 100E is substantially the same as the low coherence interferometer imaging system 100 in FIG. 1B, while the main difference therebetween lies in that at least two reference ends 130-1', 130-2' have the same optical path length in this embodiment. The imaging depth positions DR-1, DR-2, DR-1', DR-2' of the images are changed in sequence as the optical imaging modules 152, 154 are disposed at the sample end 140, and the at least two reference ends 130-1', 130-2' have the same imaging depth positions DR-1, DR-2, DR-1', DR-2'. As shown in FIG. 9A and FIG. 9B, the imaging depth position DR-1 is equal to the imaging depth position DR-2, and the imaging depth position DR-1' is equal to the imaging depth position DR-2'. However, the imaging depth position DR-1 is not equal to the imaging depth position DR-1'.

Besides, in this embodiment, the low coherence interferometer imaging system 100E incorporates a first beam-splitting element 120E, which functions as a polarization beam-splitting element. The polarization beam splitting element 120E polarizes beams in the at least two reference ends 130-1', 130-2' to be perpendicularly to each other, presenting a P polarization or an S polarization. However, note that the specific characteristics of light polarization in these reference ends 130-1', 130-2' should not be interpreted as limiting factors within this disclosure. Since the images generated by the at least two reference ends 130-1', 130-2' are located at the same imaging depth positions DR-1, DR-2, DR-1', DR-2', after the images are superimposed, an artifact resulting from polarization sensitivity in the to-be-tested sample S may be reduced.

To sum up, in one or more embodiments of the disclosure, the low coherence interferometer imaging system includes the imaging engine, the first beam splitting element, the reference ends, the sample end, and the optical imaging modules. The imaging engine is configured to generate the reference beam and the object beam. The first beam splitting element is configured to generate the sub-reference beams after the reference beam passes through first beam splitting element. The reference ends are configured to receive the sub-reference beams and reflect the sub-reference beams back to the first beam splitting element and the imaging engine. After the sample end receives the object beam, the object beam reflected by the to-be-tested sample is transmitted to the imaging engine. The reflected sub-reference beams and the reflected object beam form the interference signals through the imaging engine, and the imaging engine generates the images after analyzing the interference signals. The optical imaging modules are sequentially disposed at the sample end so that the images exhibit distinct imaging fields of view before and after the optical imaging modules are arranged and when the arrangement parameters of the imaging engine remain unchanged. In other words, the low coherence interferometer imaging system is able to generate different imaging fields of view by, for instance, serially connecting/linking the optical imaging modules. Therefore, when the overall optical system volume is relatively small, or the optical elements are arranged in a complex manner and not easy to be replaced, designing the optical imaging modules in a serially connected/lined manner helps achieve the functions of swift switching between the imaging fields of view and further reducing the system volume.

Although the disclosure has been described above through embodiments, the embodiments do not serve to pose any limitation in the disclosure. Those with ordinary knowledge in the pertinent technical field are able to make some modifications to the disclosed embodiments without departing from the spirit and scope of the disclosure, and therefore the protection scope provided in the disclosure shall be determined by the following claims and their equivalents.

What is claimed is:

1. A low coherence interferometer imaging system, comprising:
   an imaging engine, configured to generate a reference beam and an object beam;
   a first beam splitting element, disposed on an optical path of the reference beam and configured to generate a plurality of sub-reference beams after the reference beam passes through the first beam splitting element;
   a plurality of reference ends, respectively disposed on optical paths of the sub-reference beams and configured to receive and reflect the sub-reference beams back to the first beam splitting element, wherein the reflected sub-reference beams are transmitted to the imaging engine through the first beam splitting element;
   a sample end, disposed on an optical path of the object beam, wherein after the sample end receives the object beam, the object beam is transmitted to a to-be-tested sample, the to-be-tested sample reflects the object beam, and the reflected object beam is transmitted to the imaging engine through the sample end; and
   a plurality of optical imaging modules, configured to be arranged at the sample end,
   wherein the reflected sub-reference beams and the reflected object beam form a plurality of interference signals through the imaging engine, and the imaging engine analyzes the interference signals and generates a plurality of images,
   wherein the number of the optical imaging modules equals the number of the reference ends;
   wherein one of the optical imaging modules is first arranged at the sample end, and the remaining optical imaging modules are sequentially arranged at the sample end in an optical-path series manner so that the images exhibit distinct imaging fields of view before and after the optical imaging modules are arranged and when arrangement parameters of the imaging engine remain unchanged.

2. The low coherence interferometer imaging system according to claim 1, wherein the reference ends respectively have different optical path lengths, and imaging depth positions of the images change as the optical imaging modules are sequentially arranged at the sample end.

3. The low coherence interferometer imaging system according to claim 2, wherein the images have different imaging depth positions, and an image intensity of one of the images is lower than or equal to an image background noise intensity.

4. The low coherence interferometer imaging system according to claim 2, wherein the images have different imaging depth positions, and the imaging depth position of one of the images and the imaging depth position of another of the images are partially overlapped or are not overlapped.

5. The low coherence interferometer imaging system according to claim 1, wherein each of the reference ends comprises:
   a collimating lens, disposed on the optical path of one of the sub-reference beams; and
   a reflective element, wherein the collimating lens on the optical path of one of the sub-reference beams is disposed between the first beam splitting element and the reflective element, and the reflective element is configured to receive and reflect one of the sub-reference beams.

6. The low coherence interferometer imaging system according to claim 5, wherein each of the references end further comprises:

a polarization controller, disposed on the optical path of one of the sub-reference beams and between the first beam splitting element and the collimating lens.

7. The low coherence interferometer imaging system according to claim 1, wherein the sample end comprises:

a scan element, disposed on the optical path of the object beam and between the imaging engine and the optical imaging modules and electrically connected to the imaging engine.

8. The low coherence interferometer imaging system according to claim 7, wherein the imaging engine comprises:

a broadband light source, configured to generate an illumination beam;

a second beam splitting element, disposed on an optical path of the illumination beam and configured to generate the reference beam and the object beam after the illumination beam passes through the second beam splitting element, and receiving the reflected sub-reference beams and the reflected object beam to form the interference signals;

a photoelectric conversion module, disposed on an optical path of the interference signals and configured to convert synthetic signals of the interference signals into a plurality of electrical signals; and a control module, electrically connected to the photoelectric conversion module and the scan element, configured to convert the electrical signals into the images, and configured to control the scan element so as to control a position where the object beam is incident to the to-be-tested sample.

9. The low coherence interferometer imaging system according to claim 8, wherein the photoelectric conversion module is a one-dimensional spectrometer.

10. The low coherence interferometer imaging system according to claim 8, wherein the photoelectric conversion module is a two-dimensional spectrometer, and the interference signals simultaneously come from different transverse positions of the to-be-tested sample.

11. The low coherence interferometer imaging system according to claim 8, wherein the broadband light source is a swept-source light source, the swept-source light source is configured to transmit one or more trigger signals to the control module, and the photoelectric conversion module is a photoelectric sensor.

12. The low coherence interferometer imaging system according to claim 7, wherein the imaging engine comprises:

a broadband light source, configured to generate an illumination beam;

a second beam splitting element, disposed on an optical path of the illumination beam and configured to generate the reference beam and the object beam after the illumination beam passes through the second beam splitting element, and receiving the reflected sub-reference beams and the reflected object beam to form the interference signals;

a polarization beam splitting element, disposed on an optical path of the interference signals, receiving the interference signals, and outputting a plurality of differently polarized interference signals;

a plurality of photoelectric conversion modules, disposed on optical paths of the differently polarized interference signals and configured to convert the differently polarized interference signals into a plurality of electrical signals; and a control module, electrically connected to the photoelectric conversion modules and the scan element, configured to convert the electrical signals into the images, and configured to control the scan element so as to control a position where the object beam is incident to the to-be-tested sample.

13. The low coherence interferometer imaging system according to claim 7, wherein at least two of the reference ends among the reference ends have the same optical path length, an imaging depth position of the images changes as the optical imaging modules are sequentially disposed at the sample end, and the at least two reference ends have the same imaging depth position.

14. The low coherence interferometer imaging system according to claim 13, wherein the first beam splitting element is a polarization beam splitting element.

15. The low coherence interferometer imaging system according to claim 14, wherein the imaging engine comprises:

a broadband light source, configured to generate an illumination beam;

a second beam splitting element, disposed on an optical path of the illumination beam and configured to generate the reference beam and the object beam after the illumination beam passes through the second beam splitting element, and receiving the reflected sub-reference beams and the reflected object beam to form the interference signals;

a photoelectric conversion module, disposed on an optical path of the interference signals and configured to convert synthetic signals of the interference signals into a plurality of electrical signals; and a control module, electrically connected to the photoelectric conversion module and the scan element, configured to convert the electrical signals into the images, and configured to control the scan element so as to control a position where the object beam is incident to the to-be-tested sample.

*    *    *    *    *